(12) United States Patent
Lee (10) Patent No.: US 10,641,496 B2
(45) Date of Patent: May 5, 2020

(54) LIGHT SOURCE UNIT AND COOKING APPLIANCE INCLUDING THE SAME

(71) Applicant: LG ELECTRONICS INC., Seoul (KR)

(72) Inventor: Sangkyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 682 days.

(21) Appl. No.: 15/394,054

(22) Filed: Dec. 29, 2016

(65) Prior Publication Data
US 2018/0003391 A1   Jan. 4, 2018

(30) Foreign Application Priority Data
Jul. 4, 2016   (KR) .......................... 10-2016-0084168

(51) Int. Cl.
*F24C 7/08*   (2006.01)
*H05B 6/12*   (2006.01)
*F21V 33/00*   (2006.01)
*F24C 15/10*   (2006.01)
*F21V 8/00*   (2006.01)

(52) U.S. Cl.
CPC .......... *F24C 7/082* (2013.01); *F21V 33/0044* (2013.01); *F24C 7/083* (2013.01); *F24C 15/10* (2013.01); *G02B 6/0051* (2013.01); *G02B 6/0085* (2013.01); *G02B 6/0088* (2013.01); *H05B 6/12* (2013.01); *H05B 6/1209* (2013.01)

(58) Field of Classification Search
CPC .... F21V 33/0044; F21V 19/001; F21V 33/00; F21Y 2115/10; H05B 6/1218; F24C 7/082; F24C 7/083; F24C 15/10; F24C 15/2064
See application file for complete search history.

(56) References Cited

U.S. PATENT DOCUMENTS

2009/0314771 A1   12/2009 Okada et al.
2012/0118870 A1    5/2012 Shigeoka et al.
2013/0229788 A1    9/2013 Hoffman et al.
(Continued)

FOREIGN PATENT DOCUMENTS

CN   1467421    1/2004
CN   101558682   10/2009
(Continued)

OTHER PUBLICATIONS

JP-2014123425-A—English machine translation (Year: 2014).*
(Continued)

*Primary Examiner* — Jorge A Pereiro
(74) *Attorney, Agent, or Firm* — KED & Associates, LLP (57) ABSTRACT

A light source module and a cooking appliance including the same may include a light source emitting light toward a glass top plate, a light source guide to accommodate the light source, including a light transmitting path formed in the light source guide, and limit a light irradiation region so as to guide light emitted from the light source to a light display region of the glass to plate through the light transmitting path, and an attachment bracket provided between the light source guide and the glass top plate, the attachment bracket having an optical emission path to allow light to pass from the light transmitting path and the light display region.

16 Claims, 6 Drawing Sheets

(56) References Cited

U.S. PATENT DOCUMENTS

| | | | | |
|---|---|---|---|---|
| 2015/0016090 | A1* | 1/2015 | Lee | G02F 1/133608 |
| | | | | 362/97.1 |
| 2016/0116155 | A1 | 4/2016 | Bach | |
| 2016/0258631 | A1 | 9/2016 | Aihara et al. | |
| 2017/0196049 | A1* | 7/2017 | Kim | H05B 6/12 |

FOREIGN PATENT DOCUMENTS

| | | | |
|---|---|---|---|
| DE | 43 0 4525 | | 8/1994 |
| EP | 2 333 426 | | 6/2011 |
| EP | 2458285 | | 5/2012 |
| JP | S 61-012578 | | 1/1986 |
| JP | 44-44199 | | 1/2010 |
| JP | 2010-182527 | | 8/2010 |
| JP | 50-47989 | | 7/2012 |
| JP | 2012141071 A | * | 7/2012 |
| JP | 2013-054907 | | 3/2013 |
| JP | 2014-123425 | | 7/2014 |
| JP | 2014123425 A | * | 7/2014 |
| KR | 10-2003-0074005 | | 9/2003 |
| KR | 20-0368567 | | 11/2004 |
| KR | 10-2005-0005018 | | 1/2005 |
| WO | WO 2011/010428 | | 1/2011 |
| WO | WO 2015/068393 | | 5/2015 |
| WO | WO 2016/098420 | | 6/2016 |

OTHER PUBLICATIONS

JP-2012141071-A—English machine translation (Year: 2012).*
European Search Report dated Nov. 3, 2017 issued in Application No. 17151382.3.
Korean Office Action dated Dec. 7, 2017 issued in Application No. 10-2016-0101706.
Korean Office Action dated Nov. 30, 2017 issued in Application No. 10-2016-0084168.
European Search Report dated Aug. 9, 2017 issued in Application No. 17 15 1383.1.
Chinese Office Action (with English translation) dated Nov. 14, 2018 issued in CN Application No. 201710003575.2.

* cited by examiner

LIGHT SOURCE UNIT AND COOKING APPLIANCE INCLUDING THE SAME

CROSS-REFERENCE TO RELATED APPLICATIONS

This application claims priority under 35 U.S.C. § 119 to Korean Application No. 10-2016-0084168 filed on Jul. 4, 2016, whose entire disclosure is hereby incorporated by reference.

BACKGROUND

1. Field

The present disclosure relates to a light source unit and a cooking appliance including the same, and more particularly, to a light source unit included in a cooking appliance used to cook food, and a cooking appliance including the light source unit.

2. Background

A cooking appliance may cook food and may be installed in a kitchen space in order to cook food according to user intention. The cooking appliance may be classified into various types according to a heat source used therein, a shape thereof, or a fuel type.

When the cooking appliance is classified according to a method of cooking food, the cooking appliance may be classified into an open type cooking appliance or an enclosed type cooking appliance according to a form of a space in which food is placed. The enclosed type cooking appliance may include an oven, a microwave, or the like and the open type cooking appliance may include a cooktop, a hob, and so on.

The enclosed type cooking appliance may shield a space in which food is positioned and heat the shielded space to cook food. The open type cooking appliance may position food or a container containing food in an open space and heat food or a food container to cook the food.

The enclosed type cooking appliance may provide a cooking chamber that is used to place food and is shielded during cooking. The cooking chamber may be a space in which food is substantially cooked. A heat source may be provided in or outside the cooking chamber to heat the cooking chamber.

Recently, a complex cooking appliance including both an enclosed type cooking appliance and an open type cooking appliance has been proposed. The complex cooking appliance may include a plurality of heat sources so as to simultaneously cook various foods as well as a plurality of foods. As such, the complex cooking appliance including a plurality of heat sources installed therein may include a path of cooling air to cool the plurality of heat sources and an electric component.

In the complex cooking appliance, the open type cooking appliance may be provided the enclosed type cooking appliance. In addition, the open type cooking appliance may include a plurality of heaters or burners installed therein. In order to cook oven baked food such as barbecue or bread and mixed grill including baked fish, a user may use the enclosed type cooking appliance, and in order to cook general food that is placed and heated in a container, the user may use the open type cooking appliance exposed upward.

The open type cooking appliance may include an indication lamp to allow a user to externally check which heater or burner is used and where there is a danger. Through the indication lamp, the user may be able to recognize a heater or burner that is being used and recognize a current state of the heater or burner that is being used.

Among various types of open type cooking appliances, ceramic glass may be installed on an upper surface of a heater and a burner so as to expose light of an indication lamp through the ceramic glass, thereby providing various lighting effects to an upper portion of the ceramic glass. This type of open type cooking appliance may be configured in such the way that an indication lamp below the ceramic glass and light emitted through the indication lamp is transmitted through a predetermined region of the ceramic glass, thereby providing a lighting effect to an upper portion of the ceramic glass.

In order to achieve the lighting effect, it may be necessary to transmit light emitted through the indication lamp through only a predetermined region of the ceramic glass. To this end, the following two methods may be used.

A first method may include printing a non-translucent film on the remaining region except for a predetermined region, that is, a region that is predetermined for transmitting light therethrough in order to provide a lighting effect to transparent ceramic glass. A second method may include coating a film for transmitting only light with predetermined color on black ceramic glass and printing a non-translucent film on the remaining region except for a predetermined region, that is, a region that is predetermined for transmitting light therethrough in order to provide a lighting effect.

However, both methods may be used to achieve a lighting effect using special surface-treated glass formed by performing additional surface-treatment on ceramic glass. In this regard, the special surface-treated glass takes longer to manufacture and is more expensive than general ceramic glass and, thus, overall manufacturing time and manufacturing costs of a cooking appliance may be increased.

BRIEF DESCRIPTION OF THE DRAWINGS

The embodiments will be described in detail with reference to the following drawings in which like reference numerals refer to like elements wherein.

DETAILED DESCRIPTION

Figure 1:
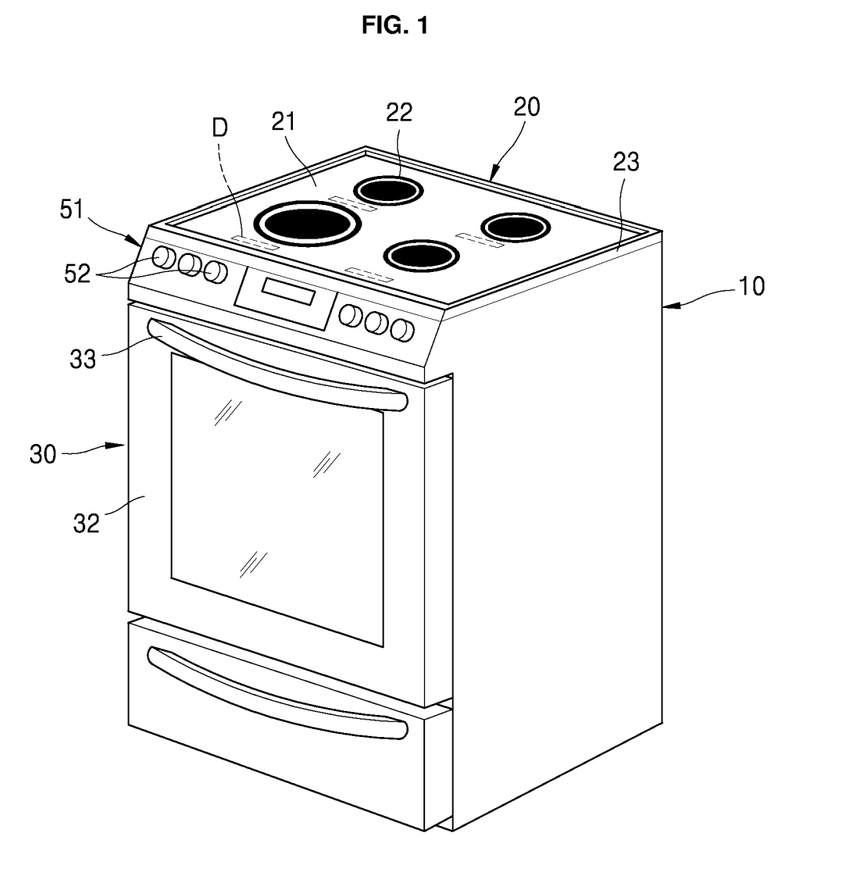
FIG. 1 is a schematic perspective view of a cooking appliance according to an embodiment of the present disclosure.
Figure 2:
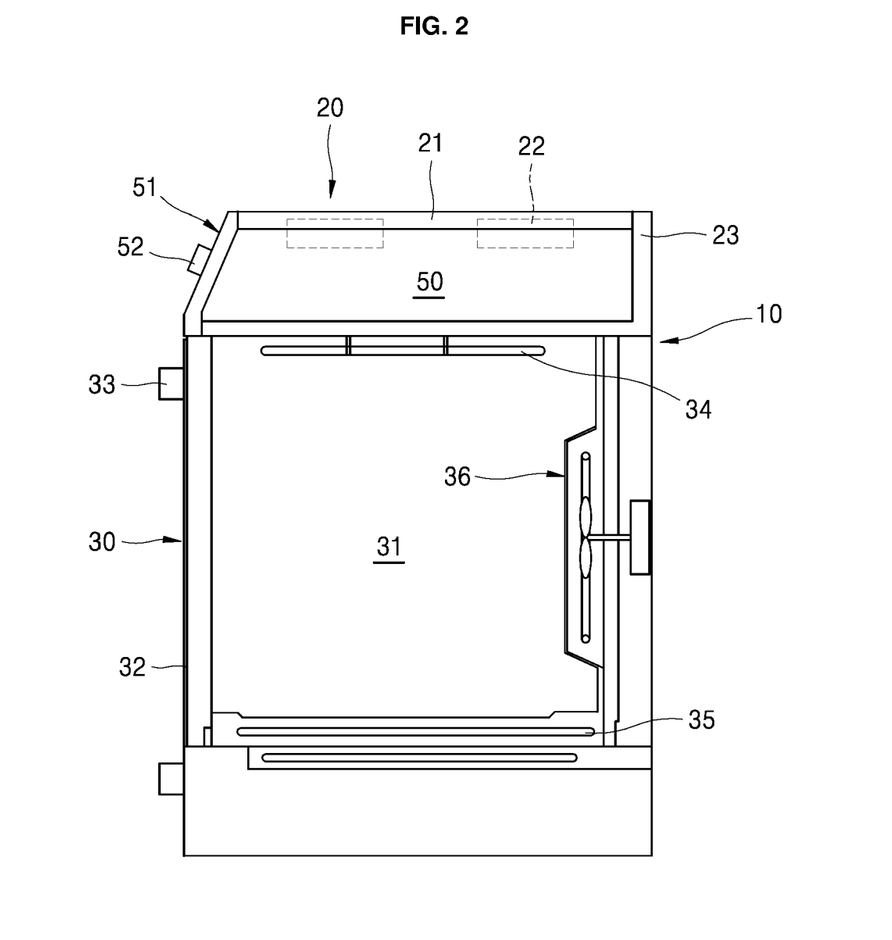
FIG. 2 is a lateral sectional view illustrating an internal configuration of a cooking appliance according to an exemplary embodiment of the present disclosure.

Referring to FIGS. 1 and 2, an outer appearance of the cooking appliance according to an exemplary embodiment of the present disclosure may be formed by a main body 10. The main body 10 may have an approximately rectangular parallelepiped shape and may be formed of a material with predetermined strength in order to protect a plurality of components installed in an internal space of the main body 10.

The main body 10 may include a cooktop portion or cooktop 20 that is formed on an upper portion so as to cook food by heating food or a container containing food, which is placed on an open space, i.e., an upper side. The cook top portion 20 may include a glass top plate 21 to support food to be cooked or a container containing the food while forming an upper outer appearance.

The glass top plate 21 may be shaped like a square plate with a predetermined thickness. The glass top plate 21 may be formed of ceramic glass with high thermal resistance and, in this case, general-purpose ceramic glass that is not separately processed in order to embody a lighting may be sufficient, but not special surface-treated glass, a surface of which is specially treated in order to achieve a lighting effect only in a predetermined region.

Food to be cooked or a container containing the food may be placed on the glass top plate 21, and at least one heater 22 to heat the food to be cooked or the container containing the food may be positioned below the glass top plate 21. An oven portion or oven 30 may be installed below the cooktop portion 20. A cooking chamber to cook food therein may be positioned within the oven portion 30.

The cooking chamber 31 may be shaped like a hexahedron with an open front surface, and the internal space of the cooking chamber 31 may be heated to cook food while the cooking chamber 31 is shielded. In the oven portion 30, the internal space of the cooking chamber 31 may be a space in which food is substantially cooked.

An upper heater 34 to heat the internal space of the cooking chamber 31 at an upper side of the cooking chamber 31 may be provided at the upper side, and a lower heater 35 to heat the internal space of the cooking chamber 31 at a lower side of the cooking chamber 31 may be further provided at the lower side.

A convection portion or convection fan 36 to allow convection of hot air to heat the internal space of the cooking chamber 31 may be provided at a rear side of the cooking chamber 31. The convection portion 36 may forcibly move air in the internal space of the cooking chamber 31. The convection portion 36 may absorb and heat air in the internal space of the cooking chamber 31, and then move air while discharging the air into the internal space of the cooking chamber 31 so as to heat the internal space of the cooking chamber 31, uniformly heating food positioned in the internal space of the cooking chamber 31.

The oven portion 30 may include a door 32 that is rotatably provided so as to selectively open and close the cooking chamber 31. The door 32 may be shaped like a hexahedron with a predetermined thickness and may include a handle 33 that is installed on a front surface of the door 32 so as to be gripped by a user to rotate the door 32. The user may easily rotate the door 32 by pulling the handle 33.

A control panel 51 may be provided on a front surface of the cooktop portion 20 above an upper side of the door 32. The control panel 51 may be shaped like a hexahedron with a predetermined internal space. An inputter or input 52 to input a manipulation signal to operate the cooktop portion 20 and the oven portion 30 may be provided on a front surface of the control panel 51.

The inputter 52 may include a plurality of manipulation switches to allow a user to directly input a manipulation signal therethrough. The control panel 51 may further include a display to provide operation information of the cooking appliance or cooking information of food and the user may check various information items on the cooking appliance through the display.

A machine room 50 in which electric components may be positioned may be formed in the internal space of the main body 10, i.e., in a space between the cooktop portion 20 and the oven portion 30. The control panel 51 may be positioned on a front surface of the machine room 50 so as to substantially shield the front surface of the machine room 50.

Figure 3:
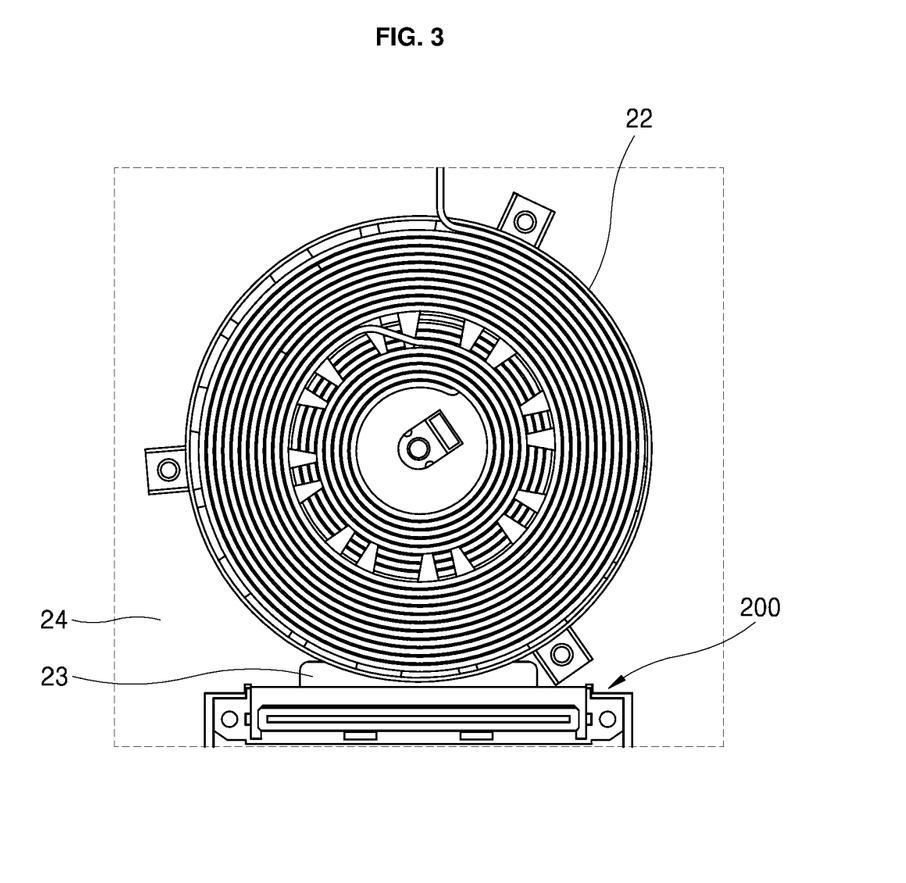
FIG. 3 is a plan view illustrating a light source module and a heater according to an exemplary embodiment of the present disclosure.
Figure 4:
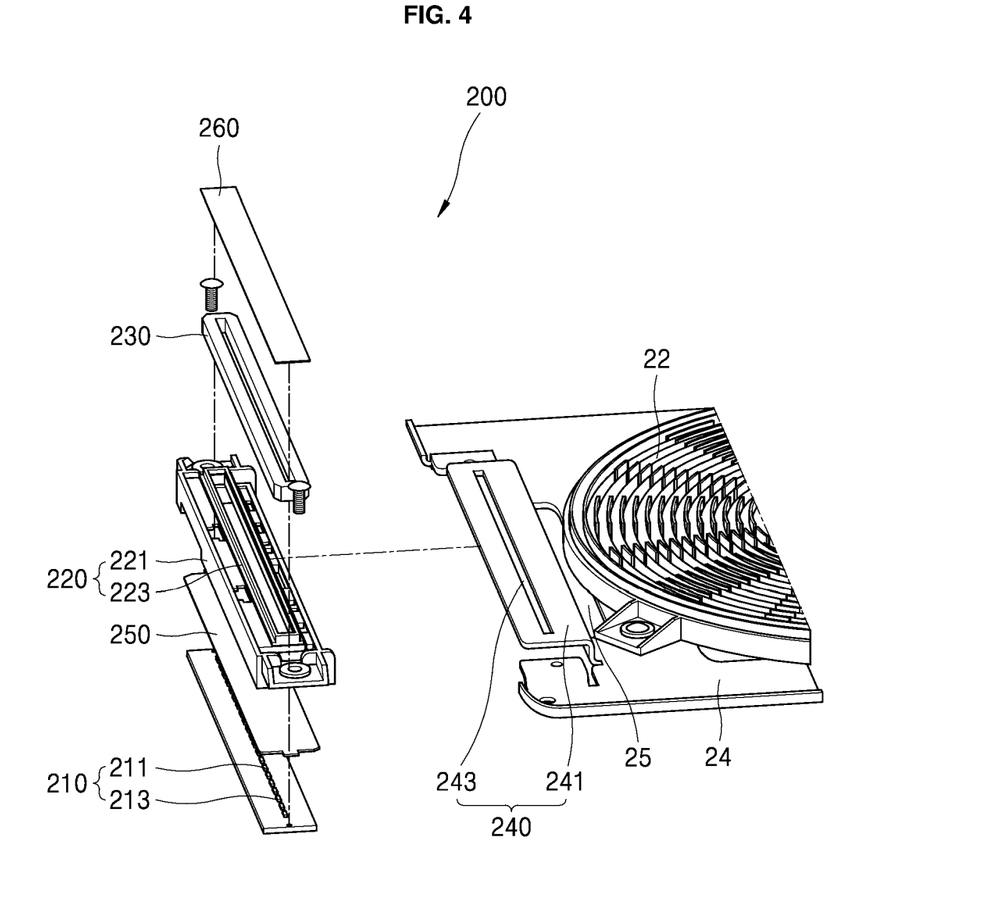
FIG. 4 is an exploded perspective view of a dissembled state of a light source module and a heater according to an exemplary embodiment of the present disclosure.

Referring to FIGS. 2 to 4, the cooktop portion 20 may include the glass top plate 21, a cooktop case 23, the heater 22, and a light source module 200. The cooktop case 23 may be positioned between the oven portion 30 and the glass top plate 21 and may be shaped like a hexahedron with an open surface while forming a predetermined internal space below the glass top plate 21.

The glass top plate 21 may be installed in an open surface of the cooktop case 23 to shield the internal space of the cooktop case 23, and at least one heater 22 may be installed in the internal space of the cooktop case 23. The heater 22 may include an induction heating module to transmit current to a magnetic coil to generate eddy current and heat a cooking container itself to cook food or include a radiant heating module to cook food using radiant heat generated by heating a heating coil.

The heater 22 may include a hidden radiant burner to heat an upper plate as a ceramic uniform burner that uses energy obtained by burning gas fuel and uses radiant energy from gas fuel instead of direct flame. In the present embodiment, an example in which the heater 22 includes an induction heating module including a coil portion to heat an induction device will be described.

The light source module 200 may include a light in a light display region D of the glass top plate 21 and may be provided below the glass top plate 21. In the present embodiment, the light display region D may be a region through which light emitted from the light source module 200 is externally recognized through the glass top plate 21, in other words, a region of the glass top plate 21 over which light emitted from the light source module 200 is shone and may be defined as a partial predetermined region of an entire region of the glass top plate 21.

The light display region D may not be a portion that is noticeably indicated on the glass top plate 21 using a method of performing separate surface-treatment on a surface of the glass top plate 21 and may simply correspond to a virtual region determined as a portion of the glass top plate 21 over which light emitted from the light source module 200 is shone.

Figure 5:
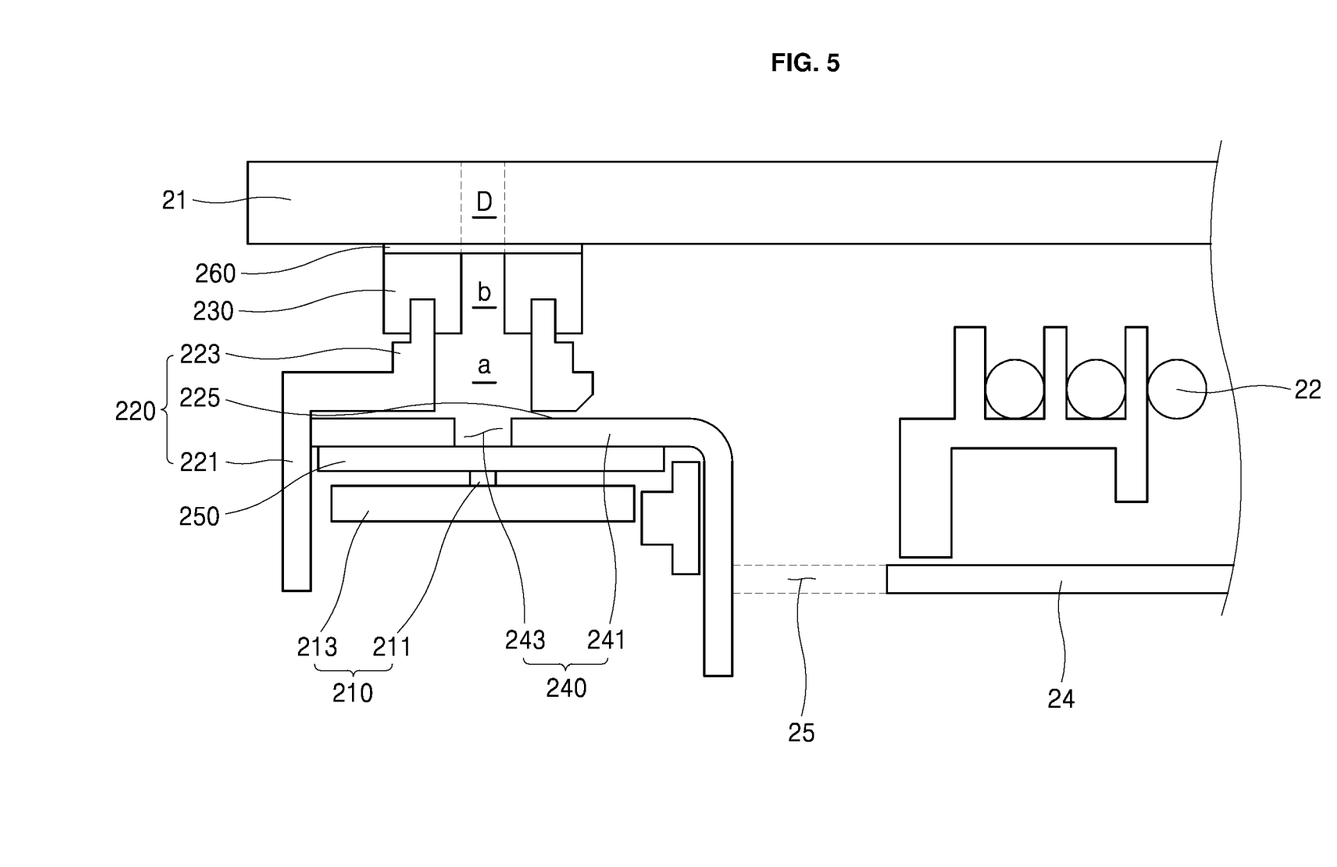
FIG. 5 is a cross-sectional view of an installation structure of a light source module according to an exemplary embodiment of the present disclosure.

Referring to FIGS. 4 and 5, the light source module 200 may include a light source 210, a light source guide 220, and an attachment bracket 230. The light source 210 may emit light toward the glass top plate 21.

In the present embodiment, the light source 210 may include light emitting diodes (LEDs) 211 as a light source. Accordingly, the light source 210 may be configured in such a way that the plurality of LEDs 211 is installed on a substrate 213 such as a printed circuit board (PCB) and, in this case, the LEDs 211 may be spaced apart from each other by a predetermined interval along a length direction of the substrate 213.

The number of the LEDs 211 and the length of the substrate 213 may be appropriately determined according to the strength and region of a lighting effect to be achieved through the light source module 200. In the present embodiment, the example in which the light source 210 uses the LEDs 211 as a light source has been described but various types of light sources such as a bulb and a fluorescent lamp as well as an LED may be applied as the light source 210.

The light source 210 may be installed in the light source guide 220. The light source guide 220 may be provided below the glass top plate 21 so as to accommodate the light source 210 and may include a light transmitting path "a" formed therein.

The light source guide 220 including the light transmitting path "a" formed therein may limit a light irradiation region so as to guide light emitted from the light source 210 toward the light display region D of the glass top plate 21 through the light transmitting path "a". According to the present embodiment, the light source guide 220 may be formed of a hard plastic material and may include a holder 221 and a barrier rib 223.

The holder 221 may be shaped like "⌐" with an open bottom surface and may include an accommodation space formed therein to accommodate the light source 210. In the present embodiment, the holder 221 and the light source 210 may be coupled to each other via coupling between an internal wall of the holder 221 and the substrate 213 of the light source 210 accommodated in the accommodation space in the holder 221 and the light source 210 may be accommodated in the holder 221 via coupling between the holder 221 and the light source 210.

The barrier rib 223 may extend toward the glass top plate 21 from the holder 221 in an upward direction. The light transmitting path "a" connected to the accommodation space in the holder 221 may be formed in the barrier rib 223.

The light source guide 220 including the holder 221 and the barrier rib 223 may be configured in such a way that the holder 221 including the accommodation space accommodating the light source 210 therein and the barrier rib 223 including the light transmitting path "a" connected to the accommodation space are connected in a vertical direction to be shaped like "凸". According to the present embodiment, the range within which light emitted from the light source 210 accommodated in the accommodation space in the holder 221 is spread may be limited by virtue of an internal wall of the barrier rib 223 that extends toward the glass top plate 21 from the holder 221.

As a result, a path that irradiates light may be guided so as to irradiate light toward the glass top plate 21 along the light transmitting path "a" in the barrier rib 223. Accordingly, light emitted from the light source 210 may be transmitted only to a region defined as the light display region D of the glass top plate 21 and, thus, a lighting effect may be sufficiently achieved even if a surface of the glass top plate 21 is not configured in the form of special surface-treated glass in order to transmit light only to a predetermined region.

A reflective portion may be further provided on the internal wall of the barrier rib 223 so as to reflect light emitted from the light source 210 toward the light display region D. The reflective portion may be formed by attaching or coating a material with high optical reflectivity such as metal, e.g., aluminum on the internal wall of the barrier rib 223. The reflective portion may be arranged on the internal wall of the barrier rib 223 so as to increase illumination of light emitted along the light transmitting path "a" and, thus, an enhanced lighting effect may be provided with low output of the light source 210.

The attachment bracket 230 may be provided between the light source guide 220 and the glass top plate 21. An optical emission path "b" between the light transmitting path "a" and the light display region D may be formed in the attachment bracket 230.

In the present embodiment, the attachment bracket 230 may be formed of an elastically deformable soft silicone or rubber material such as a fluoride resin material with high thermal resistance. The attachment bracket 230 may prevent the light source guide 220 and the glass top plate 21, which are each formed of a hard material, from directly contacting each other, prevent heat of the glass top plate 21 from being transmitted toward the light source guide 220, and provide a buffer function of absorbing shock applied to the coupling portion between the light source guide 220 and the glass top plate 21.

The optical emission path "b" in the attachment bracket 230 may connect the light transmitting path "a" and the light display region D to each other and may be have a width corresponding to a width of the light display region D. The range within which light transmitted into the attachment bracket 230 through the light transmitting path "a" is spread may be limited by virtue of the internal wall of the attachment bracket 230 and, as a result, a path for irradiating light may be guided so as to irradiate light toward the glass top plate 21 along the light Emission path "b" in the attachment bracket 230.

The attachment bracket 230 may prevent direct contact between the light source guide 220 and the glass top plate 21. The attachment bracket 230 may further provide a buffer function with respect to the coupling portion between the light source guide 220 and the glass top plate 21, and may determine an edge of a light irradiation region such that a region of light shone through the glass top plate 21 corresponds to the light display region D.

The light source module 200 according to the present embodiment may further include a shield 240. The shield 240 may shield the glass top plate 21 from the light source 210 and may include an upper heat shield plate 241 and a light passing hole 243. The upper heat shield plate 241 may shield the glass top plate 21 from the light source 210 in the accommodation space in the light source guide 220.

The light passing hole 243 may be formed through the upper heat shield plate 241 so as to open a portion between the light source 210 and the light transmitting path "a" due to the upper heat shield plate 241. The light passing hole 243 may have a minimum width as long as transmission of light emitted from the light source 210 through the light transmitting path "a" is not impeded.

When a container containing food is placed on the glass top plate 21, the container may be heated via an operation of the heater 22 to generate heat. The generated heat may be transmitted toward the light source 210 through the glass top plate 21 to cause an excessive increase in temperature of the light source 210, and the excessive increase in temperature of the light source 210 may degrade performance and lifespan of the LED 211.

In consideration of this, according to the present embodiment, the gap between the light source 210 and the glass top plate 21 with the heated container placed thereon may be shielded by the upper heat shield plate 241 so as to provide a heat shielding structure to prevent heat generated from an upper portion of the glass top plate 21 from being transmitted toward the light source 210, thereby preventing the temperature of the light source 210 from being excessively increased. The light passing hole 243 functioning as a path through which light is transmitted may be formed on the upper heat shield plate 241. Accordingly, the shield 240 may provide a heat shielding structure to effectively block transmission of heat toward the light source 210 while a light irradiation path of light emitted from the light source 210 is not impeded.

The cooking appliance according to the present embodiment may further include a support plate 24 to support the heater 22 so as to fix the heater 22 to the internal space of the cooktop case 23. For example, the support plate 24 may be a horizontally extending board formed of metal. The support plate 24 may be fixed to the cooktop case 23 in the internal space of the cooktop case 23 and a coil portion for heating induction of the heater 22 may be installed on an upper surface of the support plate 24. The shield 240 may be integrally formed with the support plate 24.

In the present embodiment, the light source module 200 may be provided at a lateral portion of the heater 22, adjacent to the heater 22, and the shield 240 may be a portion formed by extending the support plate 24 toward the light source module 200.

For example, the shield 240 may be a processed portion formed by cutting a portion of the support plate 24 extending toward the light source module 200 and then bending the cut portion in the form of "⌐". As such, a portion of the shield 240 formed by processing the portion of the support plate 24 may be inserted into the accommodation space in the light source guide 220 through the lateral portion of the light source guide 220.

To this end, a through hole 225 for passing the upper heat shield plate 241 of the shield 240 through the accommodation space in the light source guide 220 from the outside of the light source guide 220 may be formed through the lateral portion of the light source guide 220. The upper heat shield plate 241 of the shield 240 may be installed in the accommodation space in the light source guide 220 through the lateral portion of the light source guide 220 via the through hole 225.

According to the above configuration and installation structure of the shield 240, a thermal shielding structure to prevent heat generated from the upper portion of the glass top plate 21 from being transmitted toward the light source 210 may be formed only via a process of changing a shape of a portion of the support plate 24 to fix the heater 22. As described above, the light source guide 220 may be fixed onto the support plate 24 only by inserting the shield 240 integrally formed with the support plate 24 into the light source guide 220 and, thus, installation of the shield 240 and fixing of the light source guide 220 in the internal space of the cooktop case 23 may be simultaneously completed only via one operation performed to install the shield 240.

According to the above configuration and installation structure of the shield 240, a thermal shielding structure to prevent heat generated from the upper portion of the glass top plate 21 from being transmitted toward the light source 210 may be formed using the support plate 24 that is basically provided in order to fix the heater 22 without a separate component, and installation of the shield 240 and fixing of the light source guide 220 in the internal space of the cooktop case 23 may be simultaneously completed only via one operation performed to install the shield 240. Accordingly, the number of assembly processes may be reduced and manufacturing costs may be reduced compared with an operation in which separate components are used to constitute the shield 240 and are separately assembled.

A heat transfer shield 25 may be disposed between the shield 240 and a contact portion of the support plate 24 with the heater 22. A temperature of the heater 22 may be increased by influence of heat generated from a container heated by the heater 22 and, accordingly, a temperature of the support plate 24 may be increased via thermal conduction at the contact portion (hereinafter, "thermal contact portion") of the support plate 24 with the heater 22.

When heat of the support plate 24, a temperature of which is increased, is transmitted to the shield 240 to increase the temperature of the shield 240, the temperature of the light source 210 may be increased due to the shield 240 installed to shield the heat transmitted to the light source 210. In order to prevent this result, according to the present embodiment, the heat transfer shield 25 may be provided between the shield 240 and the thermal contact portion of the support plate 24. The heat transfer shield 25 may prevent thermal conduction between the thermal contact portion of the support plate 24 and the shield 240, thereby preventing a rise in the temperature of the shield 240 due to the heat of the support plate 24.

According to the present embodiment, the heat transfer shield 25 may be formed in such a way that the contact portion between the thermal contact portion of the support plate 24 and the shield 240 is cut. That is, the heat transfer shield 25 may be formed in such a way that the contact portion between the thermal contact portion of the support plate 24 and the shield 240 is cut to form a through hole.

The heat transfer shield 25 may be formed in such a way that a space is formed between the thermal contact portion of the support plate 24 and the shield 240 so as to prevent thermal conduction between the thermal contact portion of the support plate 24 and the shield 240. Prevention of thermal conduction of the heat transfer shield 25 may prevent the temperature of the shield 240 from increasing due to heat of the support plate 24.

In addition, the light source module 200 according to the present embodiment may include a first diffuser 250 and a second diffuser 260. The first diffuser 250 may be arranged between the light source 210 and the shield 240 so as to diffuse light emitted from the light source 210.

The first diffuser 250 may be configured in such a way that the light source module 200 including LEDs 211 as a point source constitutes a surface light source. The first diffuser 250 may also hide a boundary between adjacent light sources and softly spread light through the light display region D of the glass top plate 21.

In the present embodiment, the first diffuser 250 may be a diffusion sheet formed of a material such as polycarbonate (PC), polyethylene terephthalate (PET), or the like. In addition, a diffusion sheet formed of various materials with excellent thermal resistance and excellent diffusion of light may be applied to the first diffuser 250.

The second diffuser 260 may be provided on the first diffuser 250, i.e., between the attachment bracket 230 and the glass top plate 21 so as to diffuse light emitted along the optical emission path "b". The second diffuser 260 may diffuse light emitted from the light source 210 to constitute a surface light source like the first diffuser 250 and, simultaneously, function as an adhesive to couple the glass top plate 21 to the attachment bracket 230.

The second diffuser 260 may be formed of Teflon tape by coating adhesives on both surfaces of a Teflon sheet with high thermal resistance and excellent optical diffusion. In addition, sheet or adhesive tape formed of various materials with excellent thermal resistance and excellent diffusion of light may be applied to the second diffuser 260.

Hereinafter, the operation and effects of the light source module 200 and cooking appliance including the same according to the aforementioned embodiment will be described. According to the present embodiment, the glass top plate 21 may be installed on an open upper surface of the cooktop case 23 to shield the cooktop case 23 and at least one heater 22 may be installed in the internal space of the cooktop case 23 below the glass top plate 21. The light source module 200 may be arranged below the glass top plate 21 and may illuminate the light display region D of the glass top plate 21.

The light source module 200 may be configured in such a way that the light source 210 for that emits emitting light toward the glass top plate 21 is installed in the light source guide 220. The range within which light emitted from the light source 210 is spread may be limited by virtue of an internal wall of the barrier rib 223 and the attachment bracket 230 and, as a result, a path for irradiating light may be formed to irradiate light toward the glass top plate 21 along the light transmitting path "a" in the barrier rib 223 and the optical emission path "b" in the attachment bracket 230.

Accordingly, light emitted from the light source 210 may be transmitted only to a region defined as the light display region D of the glass top plate 21, and thus, a lighting effect may be sufficiently achieved even if a surface of the glass top plate 21 is not configured in the form of special surface-treated glass in order to transmit light only to a predetermined region. According to the above lighting effect, a user may accurately tell which heater is currently used among the heaters 22 and a current state of the used heater 22.

As described above, light emitted from the light source 210 may be irradiated to the light display region D of the glass top plate 21 to be diffused by the first diffuser 250 and the second diffuser 260 and to be softly spread like light emitted from a surface light source. According to the light source module 200, a lighting effect may be embodied in the form of a surface light source in the light display region D of the glass top plate 21 so as to enhance sensitive quality of a cooking appliance and to enhance user satisfaction.

The number of light source modules 200 provided to embody the above lighting effect may correspond to the number of the heaters 22. For example, one light source module 200 may be provided for each heater 22 and each light source module 200 may embody a lighting effect to indicate a state of the heater 22 associated with the corresponding light source module 200.

When a lighting effect that indicates a state of the heater 22 is embodied at a point adjacent to the heater 22 as an indication of use, a user may easily recognize information about which heater is currently in use according to the corresponding lighting effect among the heaters 22. Accordingly, the light source module 200 may be placed adjacent to the heater 22 as a target of state indication.

As such, when the light source module 200 is arranged adjacent to the corresponding heater 22, this means that the light source module 200 is exposed to an influential sphere of heat generated during cooling performed by the heater 22, or heat transmitted from the glass top plate 21. In order to shield the heat, the light source module 200 according to the present embodiment may include the shield 240 to shield the glass top plate 21 from the light source 210.

In the present embodiment, the shield 240 may be arranged between the light source 210 and the glass top plate 21 with a heated container placed thereon so as to provide a heat shielding structure to prevent heat generated from an upper portion of the glass top plate 21 from being transmitted toward the light source 210, thereby preventing the temperature of the light source 210 from being excessively increased. The light passing hole 243 functioning as a path through which light is transmitted may be formed at the shield 240. Accordingly, the shield 240 may provide a heat shielding structure to effectively shield transmission of heat toward the light source 210 while a light irradiation path of light emitted from the light source 210 is not impeded.

The shield 240 may be formed by changing a shape of the support plate 24 that supports the heater 22 without a separate component. According to the above configuration and installation structure of the shield 240, the number of assembly processes may be reduced and manufacturing costs may be reduced compared with an operation in which separate components are used to constitute the shield 240 and are separately assembled.

When the light source module 200 and a cooking appliance including the same according to the above embodiment of the present disclosure are used, a sufficiently effective lighting effect may be embodied even if general-purpose ceramic glass is used, but not special surface-treated glass, a surface of which is specially treated. Thus, manufacturing time and manufacturing costs may be reduced and a lighting effect may also be achieved resembling a surface light source so as to enhance sensitive quality of a cooking appliance and to enhance user satisfaction.

When the light source module 200 and a cooking appliance including the same according to the above embodiment of the present disclosure are used, a heat shielding structure that effectively shields transmission of heat toward the light source 210 may be provided while a light irradiation path of light emitted from the light source 210 is not impeded. This may effectively prevent the light source 210 from deteriorating and being degraded in performance due to an increase in temperature and may effectively achieve lighting even in a high-temperature environment in which food is heated and cooked.

When the light source module 200 and a cooking appliance including the same according to the above embodiment of the present disclosure are used, the shield 240 may be formed by changing a shape of the support plate 24 that supports the heater 22 without a separate component so as to reduce the number of assembly processes and manufacturing costs for installing a heat shielding structure. The aforementioned light source module 200 may be applied to a cooking appliance including a heater or a burner that autonomously generates heat as a heater, such as a radiant heating module for cooking food using radiant heat generated from heating coils or a hidden radiant burner for heating an upper plate as a ceramic uniform burner that uses energy obtained by burning gas fuel and uses radiant energy from gas fuel instead of direct flame as well as a cooking appliance using an induction heating module as a heater.

Figure 6:
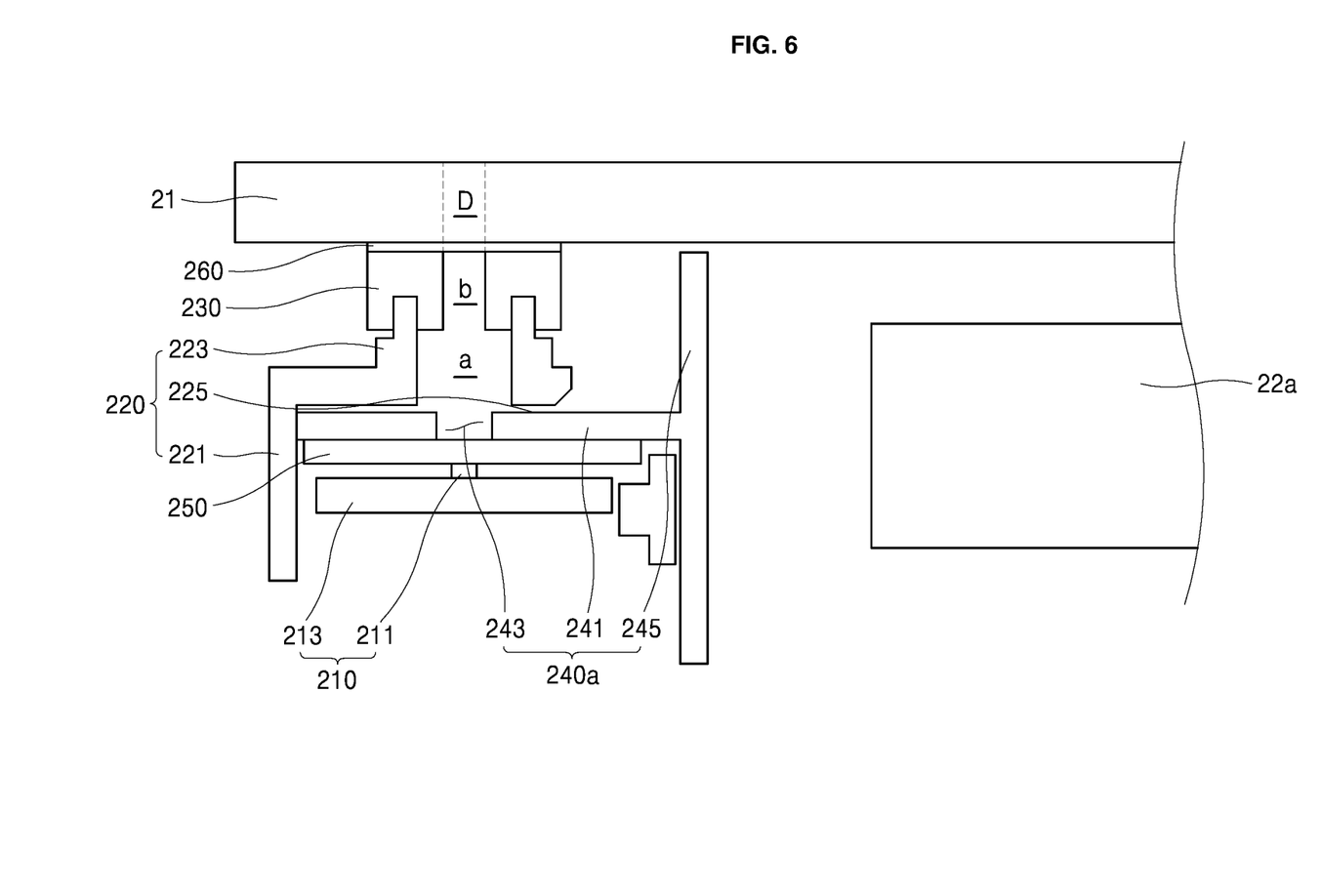
FIG. 6 is a cross-sectional view of an installation structure of a light source module according to another exemplary embodiment of the present disclosure.

Hereinafter, an example in which a light source module is installed in a cooking appliance configured by applying a radiant heating module or a hidden radiant burner as a heater will be described with reference to FIG. 6. As illustrated in FIG. 6, in a cooking appliance configured by applying a heater or burner for autonomously generating heat or flame as a heater 22a like a radiant heating module or a hidden radiant burner, heat generated from the heater 22a as well as heat generated from the upper portion of the glass top plate 21 may be transmitted toward the light source 210 by the heated container.

Influence of heat transmitted in a lateral direction from the heater 22a as well as heat transmitted in a downward direction from the glass top plate 21 may be applied to the light source 210. Accordingly, in the present embodiment, a shield 240a may further include a lateral heat shielding plate 245 in the upper heat shield plate 241.

The shield 240a according to the present embodiment may shield the glass top plate 21 from the light source 210 through the upper heat shield plate 241 so as to form a heat shielding structure to prevent heat generated from an upper portion of the glass top plate 21 from being transmitted toward the light source 210 and may shield the heater 22 from the light source 210 through the lateral heat shielding plate 245 so as to form a heat shielding structure to prevent heat generated from the heater 22 from being transmitted toward the light source 210. When the light source module 200 including the shield 240a according to the present embodiment may be used, a heat shielding structure is appropriately formed according to the position and direction to heat generation heat that affects a temperature of the light source 210 so as to be applied to various types of cooking appliances having different types and heating types of the heater 22 with an optimum lighting effect.

When a light source module and a cooking appliance including the same according to the present disclosure are used, a sufficiently effective lighting effect may be embodied even if general-purpose ceramic glass is used, but not special surface-treated glass, a surface of which is specially treated and, thus, manufacturing time and manufacturing costs may be reduced and a lighting effect may also be achieved resembling a surface light source so as to enhance sensitive quality of a cooking appliance and to enhance user satisfaction.

According to the present disclosure, a heat shielding structure to effectively shield transmission of heat toward a light source may be provided while a light irradiation path of light emitted from the light source is not impeded so as to effectively prevent the light source from deteriorating and being degraded in performance due to increase in temperature and to effectively achieve lighting even in a high-temperature environment in which food is heated and cooked. A shield may be formed by changing a shape of a support plate that supports a heater without a separate component so as to reduce the number of assembly processes and manufacturing costs for installing a heat shielding structure.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

A light source module may include a light source emitting light toward a glass top plate, a light source guide to accommodate the light source, including a light transmitting path formed in the light source guide, and limit a light irradiation region so as to guide light emitted from the light source to a light display region of the glass to plate through the light transmitting path, and an attachment bracket provided between the light source guide and the glass top plate, the attachment bracket having an optical emission path to allow light to pass from the light transmitting path to the light display region. The light source guide may include a holder including an accommodation space to accommodate the light source, and a barrier rib extending toward the glass top plate from the holder and including the light transmitting path formed in the barrier rib and connected to the accommodation space.

The light source module may further include a shield to shield the glass top plate from the light source. The shield may include an upper heat shield plate that shields the glass top plate from the light source in the accommodation space, and a light passing hole formed through the upper heat shield plate that opens a portion between the light source and the light transmitting path.

The light source guide may be configured in such a way that a holder including an accommodation space to accommodate the light source and a barrier rib including the light transmitting path formed in the light source guide and connected to the accommodation space are connected in a vertical direction to be shaped like "⌐", and a through hole may be formed in a lateral portion of the light source guide in order to allow the upper heat shield plate to pass through the accommodation space from an outside of the light source guide. The shield may further include a lateral heat shielding plate that shields the light source from a heater installed below the glass top plate.

The shield may be formed by extending a support plate provided to support a heater installed below the glass top plate toward the light source module. A heat transfer shield that shields heat transfer between the shield and a contact portion of the support plate with the heater may be provided between the shield and the contact portion of the support plate with the heater.

The light source module may further include a first diffuser provided between the light source and the shield that diffuses light emitted from the light source. The light source module may further include a second diffuser provided between the attachment bracket and the glass top plate that diffuses light emitted through the optical emission path. The attachment bracket may include an elastic material with high thermal resistance.

A cooking appliance may include a glass top plate that forms an outer appearance of an upper surface, a cooktop case that forms an internal space between the glass top plate, a heater in the internal space of the cooktop case, and a light source module that emits light to a light display region of the glass top plate, wherein the light source module includes a light source that emits light toward the glass top plate, a light source guide to accommodate the light source, including a light transmitting path formed in the light source guide, and limit a light irradiation region to guide light emitted from the light source to the light display region through the light transmitting path, and an attachment bracket provided between the light source guide and the glass top plate and including an optical emission path formed in the attachment bracket to connect the light transmitting path and the light display region. The cooking appliance may further include a support plate to support the heater and fix the heater to an internal space of the cooktop case, wherein the light source module may further include a shield to shield the glass top plate from the light source, and the shield may be formed by extending a support plate provided to support a heater installed below the glass top plate toward the light source module.

The heater may include a coil portion that heats by an induction, and the shield may include an upper heat shield plate installed to shield the glass top plate from the light source in the accommodation space. The heater may include a heater or burner to generate heat or flame, the light source module may further include a shield to shield the glass top plate from the light source, and the shield may include an upper heat shield plate to shield the glass top plate from the light source in the accommodation space and a lateral heat shielding plate to shield the light source guide from a heater installed below the glass top plate.

A light source module and a cooking appliance including the same are described with regard to exemplary embodiments of the invention with reference to the attached drawings. For convenience of description, the thicknesses of lines and the size of components in the drawings are exaggerated for clarity. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light source module comprising:
   a light source to emit light toward a glass top plate;
   a light source guide to accommodate the light source, form a light transmitting path formed therein, and limit a light irradiation region so as to guide light emitted from the light source to a light display region of the glass top plate through the light transmitting path; and
   an attachment bracket provided between the light source guide and the glass top plate, the attachment bracket having an optical emission path to allow light to pass from the light transmitting path to the light display region,
   a diffuser provided between the attachment bracket and the glass top plate that diffuses light emitted through the optical emission path,
   wherein the diffuser includes Teflon tape formed by coating adhesives on both surfaces of a Teflon sheet.

2. A cooking appliance comprising the light source module of claim 1.

3. A light source module comprising:
   a light source to emit light toward a glass top plate;
   a light source guide to accommodate the light source, form a light transmitting path formed therein, and limit a light irradiation region so as to guide light emitted from the light source to a light display region of the glass top plate through the light transmitting path; and
   an attachment bracket provided between the light source guide and the glass top plate, the attachment bracket having an optical emission path to allow light to pass from the light transmitting path to the light display region;
   a shield to shield the glass top plate from the light source, wherein the shield includes:
      an upper heat shield plate that shields the glass top plate from the light source in an accommodation space, and
      a light passing hole formed through the upper heat shield plate that opens a portion between the light source and the light transmitting path, wherein:
   the light source guide is configured in such a way that a holder having the accommodation space to accommodate the light source and a barrier rib having the light transmitting path formed in the light source guide and connected to the accommodation space are connected in a vertical direction, wherein the barrier rib is narrower than the holder, and
   a through hole is formed in a lateral portion of the light source guide to allow the upper heat shield plate to pass through the accommodation space from an outside of the light source guide.

4. The light source module according to claim 3, wherein the light source guide includes:
   the holder having the accommodation space to accommodate the light source; and
   the barrier rib extending toward the glass top plate from the holder and having the light transmitting path formed in the barrier rib and connected to the accommodation space.

5. The light source module according to claim 3, wherein the shield is formed by extending a support plate toward the light source module that supports a heater installed below the glass top plate.

6. The light source module according to claim 3, wherein the shield further includes a lateral heat shielding plate that shields the light source from a heater installed below the glass top plate.

7. The light source module according to claim 3, wherein:
   the shield is formed by extending a support plate provided to support a heater installed below the glass top plate toward the light source module; and
   a heat transfer shield that shields heat transfer between the shield and a contact portion of the support plate with the heater is provided between the shield and the contact portion of the support plate with the heater.

8. The light source module according to claim 7, wherein the shield is formed by cutting a section of the support plate between the heater and the shield.

9. The light source module according to claim 3, further including a diffuser provided between the light source and the shield that diffuses light emitted from the light source.

10. The light source module according to claim 3, further including a diffuser provided between the attachment bracket and the glass top plate that diffuses light emitted through the optical emission path.

11. The light source module according to claim 3, wherein the attachment bracket includes an elastic material with high thermal resistance.

12. A cooking appliance comprising:
   a glass top plate that forms an outer appearance of an upper surface;
   a cooktop case that forms an internal space below the glass top plate;
   a heater in the internal space of the cooktop case; and
   a light source module that emits light to a light display region of the glass top plate,
   wherein the light source module includes:
      a light source that emits light toward the glass top plate;
      a light source guide to accommodate the light source, form a light transmitting path formed in the light source guide, and limit a light irradiation region to guide light emitted from the light source to the light display region through the light transmitting path;
      an attachment bracket provided between the light source guide and the glass top plate and including an optical emission path formed in the attachment bracket to connect the light transmitting path and the light display region; and a shield to shield the glass top plate from the light source, wherein the shield includes:
  an upper heat shield plate that shields the glass top plate from the light source in an accommodation space, and
  a light passing hole formed through the upper heat shield plate that opens a portion between the light source and the light transmitting path, wherein:
the light source guide is configured in such a way that a holder having the accommodation space to accommodate the light source and a barrier rib having the light transmitting path formed in the light source guide and connected to the accommodation space are connected in a vertical direction, wherein the barrier rib is narrower than the holder; and
a through hole is formed in a lateral portion of the light source guide to allow the upper heat shield plate to pass through the accommodation space from an outside of the light source guide.

13. The cooking appliance according to claim 12, wherein:
  the heater includes a heater or burner to generate heat or flame;
  the light source module includes the shield to shield the glass top plate from the light source; and
  the shield includes the upper heat shield plate to shield the glass top plate from the light source in the accommodation space and a lateral heat shielding plate to shield the light source guide from the heater installed below the glass top plate.

14. The cooking appliance according to claim 12, further including a heat transfer shield to shield heat transfer between the shield and a contact portion of support plate to support the heater when the heater is provided between the shield and the contact portion of the support plate with the heater.

15. The cooking appliance according to claim 14, wherein the heat transfer shield is formed by cutting a section of the support plate between the heater and the shield.

16. The cooking appliance according to claim 12, wherein:
  the heater includes a coil portion that heats by induction.

* * * * *